United States Patent
Farrell et al.

(10) Patent No.: US 10,839,298 B2
(45) Date of Patent: Nov. 17, 2020

(54) ANALYZING TEXT DOCUMENTS

(71) Applicant: International Business Machines Corporation, Armonk, NY (US)

(72) Inventors: Robert George Farrell, Cornwall, NY (US); Oktie Hassanzadeh, Port Chester, NY (US); Mohammad Sadoghi Hamedani, Chappaqua, NY (US); Meinolf Sellmann, Cortlandt Manor, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 523 days.

(21) Appl. No.: 15/365,691

(22) Filed: Nov. 30, 2016

(65) Prior Publication Data

US 2018/0150753 A1    May 31, 2018

(51) Int. Cl.
*G06N 5/02* (2006.01)
*G06F 16/36* (2019.01)
*G06F 40/30* (2020.01)
*G06F 40/211* (2020.01)

(52) U.S. Cl.
CPC ........ *G06N 5/022* (2013.01); *G06F 16/367* (2019.01); *G06F 40/211* (2020.01); *G06F 40/30* (2020.01)

(58) Field of Classification Search
CPC ........ G06N 20/00; G06N 5/022; G06N 20/10; G06N 20/20; G06F 16/637; G06F 17/271; G06F 16/285; G06F 16/9024
See application file for complete search history.

(56) References Cited

U.S. PATENT DOCUMENTS

| | | | | |
|---|---|---|---|---|
| 8,788,535 B2* | 7/2014 | Bonev | ............... | G06Q 10/109 |
| | | | | 707/793 |
| 2003/0130855 A1* | 7/2003 | Babu | ............... | H03M 7/30 |
| | | | | 704/500 |
| 2010/0145720 A1* | 6/2010 | Reiner | ............... | G06Q 50/2057 |
| | | | | 705/2 |
| 2013/0096947 A1 | 4/2013 | Shah et al. | | |
| 2013/0325787 A1 | 12/2013 | Gerken et al. | | |
| 2015/0095017 A1* | 4/2015 | Mnih | ............... | G06N 3/0472 |
| | | | | 704/9 |
| 2015/0127632 A1* | 5/2015 | Khaitan | ............... | G06F 16/36 |
| | | | | 707/722 |
| 2016/0098645 A1* | 4/2016 | Sharma | ............... | G06N 20/00 |
| | | | | 706/12 |

(Continued)

OTHER PUBLICATIONS

Scorzato, Luigi. "On the role of simplicity in science." Synthese 190.14 (2013): 2867-2895. (Year: 2013).*

(Continued)

*Primary Examiner* — Kamran Afshar
*Assistant Examiner* — Benjamin J Buss
(74) *Attorney, Agent, or Firm* — Kevin M. Jordan, Esq.; McGinn IP Law Group, PLLC

(57) ABSTRACT

A computer-implemented method of analyzing text documents, includes identifying a relationship in a text document associated with an entity, building a predictive model from training data, in response to said identifying a relationship, wherein the predictive model includes a prediction error, and determining whether to store the identified relationship in memory, based on the prediction error.

20 Claims, 9 Drawing Sheets

(56) References Cited

U.S. PATENT DOCUMENTS

2016/0232160 A1* 8/2016 Buhrmann ............ G06F 16/367

OTHER PUBLICATIONS

Scorzato, Luigi. "On the role of simplicity in science." Synthese 190. 14 (2013): 2867-2895. (Year: 2013).*
Poveda-Villalón, M. et al. (2010). "A double classification of common pitfalls in ontologies." Workshop on Ontology Quality (OntoQual 2010), Co-located with EKAW. 2010. (Year: 2010).*
Peter Mel, et al., "The NIST Definition of Cloud Computing", IBM Confidential: Attorney Work Product; Nov. 2015, pp. 7-13.
"An Ontology-Based Architecture for Adaptive Work-Centered User Interface Technology", An IP.com Prior Art Database Technical Disclosure, IP.com No. IPCOM000134526D, Mar. 8, 2006, pp. 1-140.
"A System and Method for a Generic, Domain Customizable, Aspect Based Aggregation of Sentiments from Text Documents", An IP.com Prior Art Database Technical Disclosure, IP.com No. IPCOM000241518D, May 8, 2015, pp. 1-5.

* cited by examiner

ANALYZING TEXT DOCUMENTS

BACKGROUND

The present invention relates generally to analyzing text documents, and more particularly, to analyzing text documents that includes determining whether to store an identified relationship in memory, based on prediction error of a predictive model.

One challenge in building a knowledge graph for a new domain is selecting the relationships at the right level of abstraction. Currently, this is done manually, which is time consuming, error prone, and incorporates bias. This is important for a wide range of cognitive computing applications.

SUMMARY

An exemplary aspect of the present invention is directed to a computer-implemented method of analyzing text documents. The method includes identifying a relationship in a text document associated with an entity, building a predictive model from training data, in response to said identifying a relationship, wherein the predictive model includes a prediction error, and determining whether to store the identified relationship in memory, based on the prediction error.

Other exemplary aspects of the present invention are directed to a system and computer program product for analyzing text documents.

BRIEF DESCRIPTION OF THE DRAWINGS

Aspects of the present invention will be better understood from the following detailed description of the exemplary embodiments of the invention with reference to the drawings, in which.

DETAILED DESCRIPTION

Figure 1:
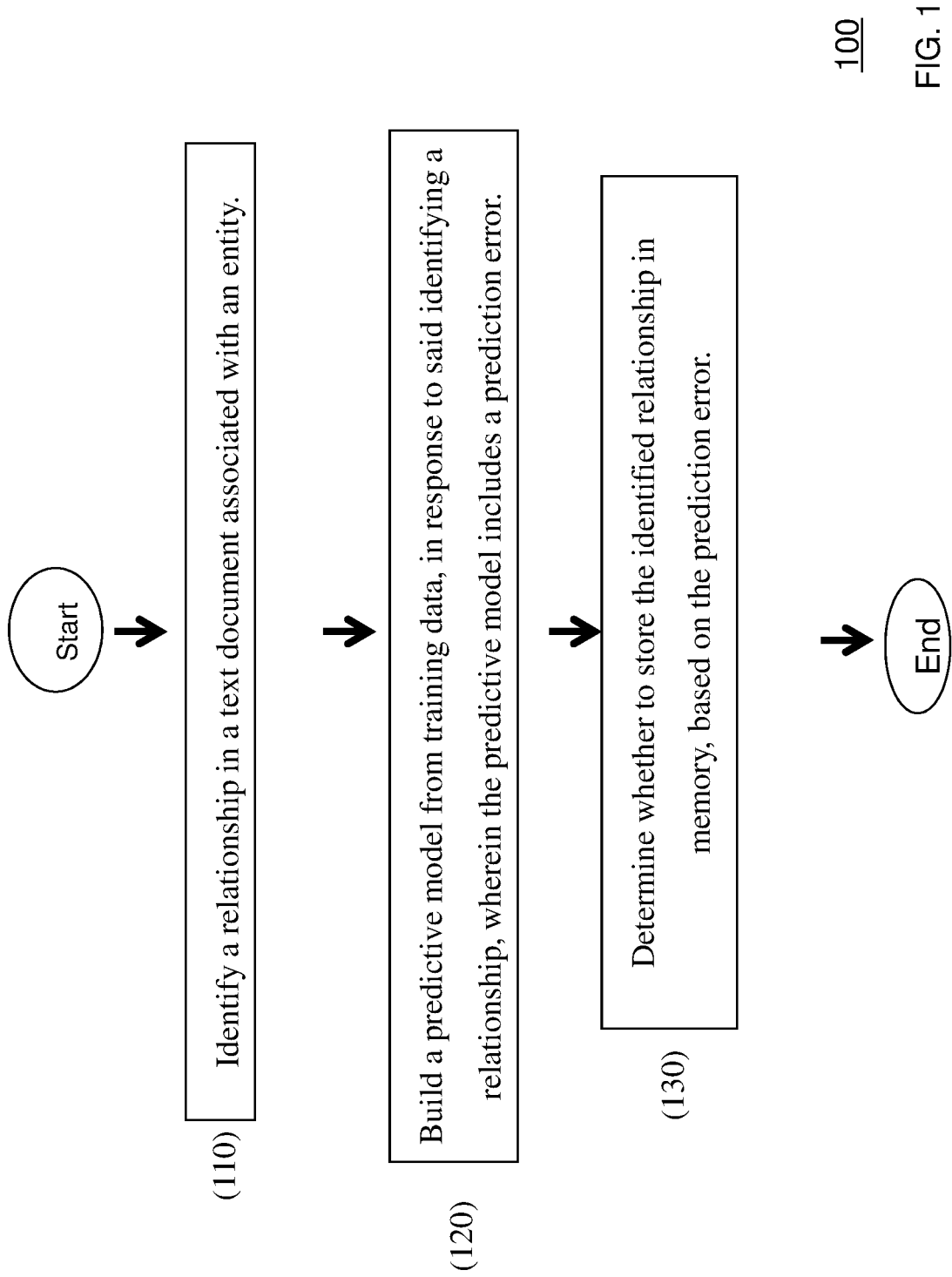
FIG. 1 illustrates a method 100 (e.g., computer-implemented method) of analyzing text documents according to an exemplary aspect of the present invention.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Conceptual graphs, lexical databases, knowledge graphs, and other ontologies model knowledge in terms of relations between concepts, typically at multiple levels of abstraction. These ontologies are often used as a starting point for domain modeling for decision-making tasks.

By way of example (without limitation), users of a real estate service may want houses described in terms of concepts and relations so that features of houses that are predictive of a particularly high or low sale price are apparent. By way of another example (without limitation), users of a city planning system may want potential house locations described in terms of concepts and relationships such that features that are predictive of a particularly high or low crime rate are apparent. By way of yet another example (without limitation), users of a car insurance comparative shopping web site may want insurance plans described in terms of concepts and relationships such that features of cars that are predictive of a high vs. low insurance rate are used.

There are often numerous ways to describe and represent knowledge in various domains and applications. A knowledge graph is a knowledge base or database of entities and relations that encode information such as facts in a domain. These facts can be used for question answering systems and as support for making a decision (e.g., buying a house).

However, the process of selecting appropriate relationships to include in knowledge graphs is currently performed largely manually. Therefore, a way is needed to augment knowledge graphs with new relationships automatically. For knowledge graphs in a given domain to be more usable for various question answering and decision-making applications, they should be augmented with concise, higher-level relationships, so as to succinctly represent a wide range of specific entities and relationships identified in a set of text documents.

FIG. 1 illustrates a method 100 (e.g., computer-implemented method) of analyzing text documents according to an exemplary aspect of the present invention. As illustrated in FIG. 1, the method 100 includes various steps to analyze text documents. One or more computers of a computer system according to an embodiment of the present invention can include a memory having instructions stored in a storage system to perform the steps of FIG. 1.

Thus, the method 100 of analyzing text documents according to an exemplary aspect of the present invention, may act in a more sophisticated and useful fashion, and in a cognitive manner while giving the impression of cognitive mental abilities and processes related to knowledge, attention, memory, judgment and evaluation, reasoning, and advanced computation. For example, a computer system can be said to be "cognitive" if it possesses macro-scale properties—perception, goal-oriented behavior, learning/memory and action—that are generally agreed as cognitive characteristics of human systems. As will be described/illustrated herein, exemplary aspects of the present invention (see e.g., FIGS. 1-6) may be implemented in a cloud computing environment 50 (see e.g., FIG. 8).

In the present application, a "database" includes any graph data such as a knowledge graph in any data structure in memory that includes graph data. The database may have a schema, in which case, adding a relationship may or may not expand the schema. It may just add data in the existing schema if the relationship type is already in the database.

Further, a "knowledge graph" is a graph of entity types (also called concepts) with relations between them. A "relation" is a generalized type of association (e.g., "geographicallyLocatedIn"). A "relationship" is a pattern linking entity types or set of entity types through a relation (the set "motorcycle" or "car" could be related to "regular gas" through "usesFuel").

A "triple" is a binary association between two entities through a relation (e.g., "White House', geographicallyLocatedIn, "Washington, D.C."). A triple is a particular instance of a relationship. A feature is an attribute or property of an entity. For example, the entity of the White House may have the features ("geographicallyLocatedIn Washington D.C." and "livesIn-reverse President of the United States"—1.0) where the "livesIn" relationship had to be reversed to be a property of "White House".

Referring again to FIG. 1, the method 100 includes identifying (110) a relationship (e.g., a plurality of relationships) in a text document (e.g., a plurality of text documents) associated with an entity, building (120) a predictive model from training data, in response to said identifying a relationship, wherein the predictive model includes a prediction error, and determining (130) whether to store the identified relationship in memory, based on the prediction error. For example, the method 100 may determine to store the identified relationship if a value of the prediction error using a feature incorporating the relationship is below a threshold value.

The determining (130) of whether to store the identified relationship may include, for example, augmenting a knowledge graph with the relationship. In particular, the knowledge graph may be augmented if the prediction error over training data was reduced when the feature incorporating the relationship was used in the predictive model.

Further, the relationship may include a triple which includes a set of concepts related to a second set of concepts, and the determining (130) of whether to store the identified relationship is based on a conciseness of the triple. Further, the determining (130) of whether to store the identified relationship may be based on a support for the triple in the text document.

Some embodiments of method 100 may include generating a plurality of features for the entities from a plurality of relationships. Some embodiments of method 100 may also include selecting relationships at varying levels of abstraction, such as by selecting relationships that are based on a directed acyclic graph (DAG) of concept types and a DAG of relationship types, and/or are empirically determined from the text documents. The method 100 may also select relationships that have sufficient predictive power, have sufficient support in terms of matching relationships in the text documents (if there is a disjunctive set, then any entity may match), and/or have conciseness (e.g., incorporate the least number of disjuncts of entity types).

Figure 2:
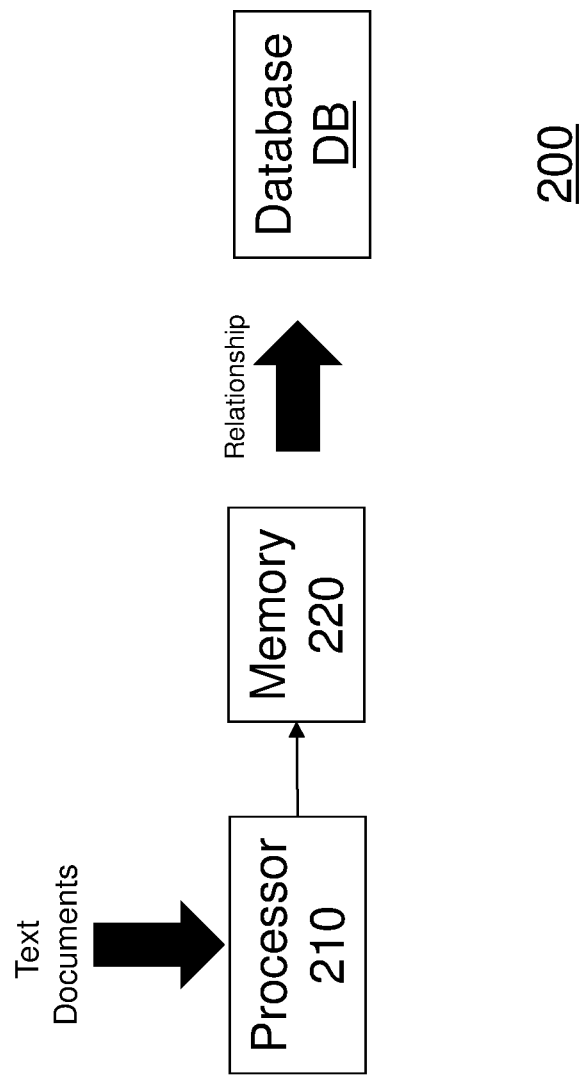
FIG. 2 illustrates a system 200 for analyzing text documents, according to an exemplary aspect of the present invention.

FIG. 2 illustrates a system 200 for analyzing text documents, according to an exemplary aspect of the present invention. As illustrated, the system 200 includes a processor 210, and a memory 220, operably coupled to the processor 210, the memory storing instructions that when executed, cause the processor 210 to perform a method of analyzing text documents. In particular, the processor may identify a relationship (e.g., a plurality of relationships) in a text document (e.g., a plurality of text documents) associated with an entity, build a predictive model from training data, in response to said identifying a relationship, wherein the predictive model includes a prediction error, and determine whether to store the identified relationship in memory, based on the prediction error.

In some embodiments, the processor 210 may execute the instructions to perform the method 100 described above.

In an exemplary aspect, the system 200 may augment knowledge graphs with concise higher-level relationships. These relationships can be extracted, for example, directly from text documents (e.g., natural language text documents).

A knowledge graph with concise higher-level relationships may be useful for:
1) Decision support at an appropriate level of abstraction. Predictive relationships help differentiate between tough choices;
2) Natural language question answering, generation, summarization, and dialogue at an appropriate level of abstraction; and
3) Analytical exploration/navigation such as drill down and roll up operations over the knowledge graph. Drill down and roll up operations are the key components of traditional analytics platforms based on relational data warehouses. Therefore, an exemplary aspect of the present invention may bring such capability to knowledge graphs (e.g., building knowledge cubes).

Some aspects of the present invention may make use of the fact that there may be a large space of possibilities for relating various sets of entities. If the training data for a predictive model includes coverage for entities that use the relationships as features, then prediction error can be used to guide the selection of the level of abstraction.

Some aspects of the present invention may thus identify particular relationships in text documents, where the text documents are each associated with entities, and the relationships are composed from taxonomies of concept and relation types. Such aspects may then generate features for the entities from the relationships, and augment a knowledge graph with the relationships based on the prediction error (e.g., if a value of the prediction error using the features is below a threshold value).

For example, assume that a person is using a realtor web site to find a house at a reasonable price. Assume also that historical price data for the houses sold is available, and that there are textual descriptions associated with each of the houses.

In this case, an exemplary input to the system 200 may be as follows:
House 1 Text description: A house adjacent to a playground. Price: $500K
House 2 text description: A house next to a sewer. Price: $200K
Two taxonomies may be input to the system 200, or may be extracted from the text document:
1) concept-type taxonomy:
Playground→recreational facility→place
Sewer→waste facility→place
2) relation-type taxonomy:
nextTo→near
adjacentTo→near The system 200 may then select predictive relationships (to augment a knowledge graph) from the concept-type taxonomy and the relation-type taxonomy. Thus, an exemplary output from system 200 may be as follows:
1) house near wasteFacility
2) house near recreationalFacility The system 200 may include one or more of the following advantages:
1) automatically select a level of relationships;
2) search for higher-level relationships, and consider conciseness of the relationships and support of the relationships;

3) select a level of abstraction of the relation type; and
4) use prediction error to select relationships.

For example, the system 100 may select (e.g., determine) an optimum level of abstraction by selecting relationships that:
1) are based on a DAG of concept types and a DAG of relation types;
2) are empirically determined from the text documents;
3) have enough predictive power;
4) have enough support in terms of matching examples in the text; and
5) are concise (e.g., incorporate the least number of disjuncts of concept types).

It should be noted that concepts and relations need not be connected into a knowledge graph when input. Rather, they can be separate inputs to guide a computer-implemented method of the algorithm.

The concepts and relations could also be extracted from the text documents using various approaches (e.g., distributional semantics). The concepts and relations can be hierarchical, but in general can be directed acyclic graphs (DAGs).

For example, verbs and (verb+preposition)s may be mapped to relations (e.g. nextTo). Nouns and noun phrases may be mapped to concepts (e.g. playground).

In the realtor web site example above, "relationships" may be triples that relate a generalization of the target entity, an entity type (e.g., 'house' as a generalization of a particular house), through a relation (e.g., nextTo) to another entity type ('house'). The arguments of the relationships may be disjuncts (e.g. "elementary School" or "Secondary School").

Further, multiple prediction problems may utilize the same concepts and relations and can thus be used to augment knowledge graphs in different ways. For example, predicting house prices and predicting ability to rent rooms as a temporary bed and breakfast may utilize the same concepts and relation but end up with very different knowledge graphs.

It should also be noted that "conciseness" is the multiplicative inverse of the "description length" of a relationship. For example, in a subject-relation-object triple, "description length" is the number of disjunctive concepts in the "subject" of the triple combined with (multiplied by) the number of disjunctive concepts in the "object" of the triple-the number of ways the various pairs of concepts can be related.

An exemplary aspect of the present invention may use the second set of concepts (the set of disjunctive set of concepts filling the "object" of the triple). However, the present invention may be applied equally well to all arguments in a relationship. For example, the relationship may be a "frame" or other n-ary relationship, not just subject-relation-object.

Figure 3:
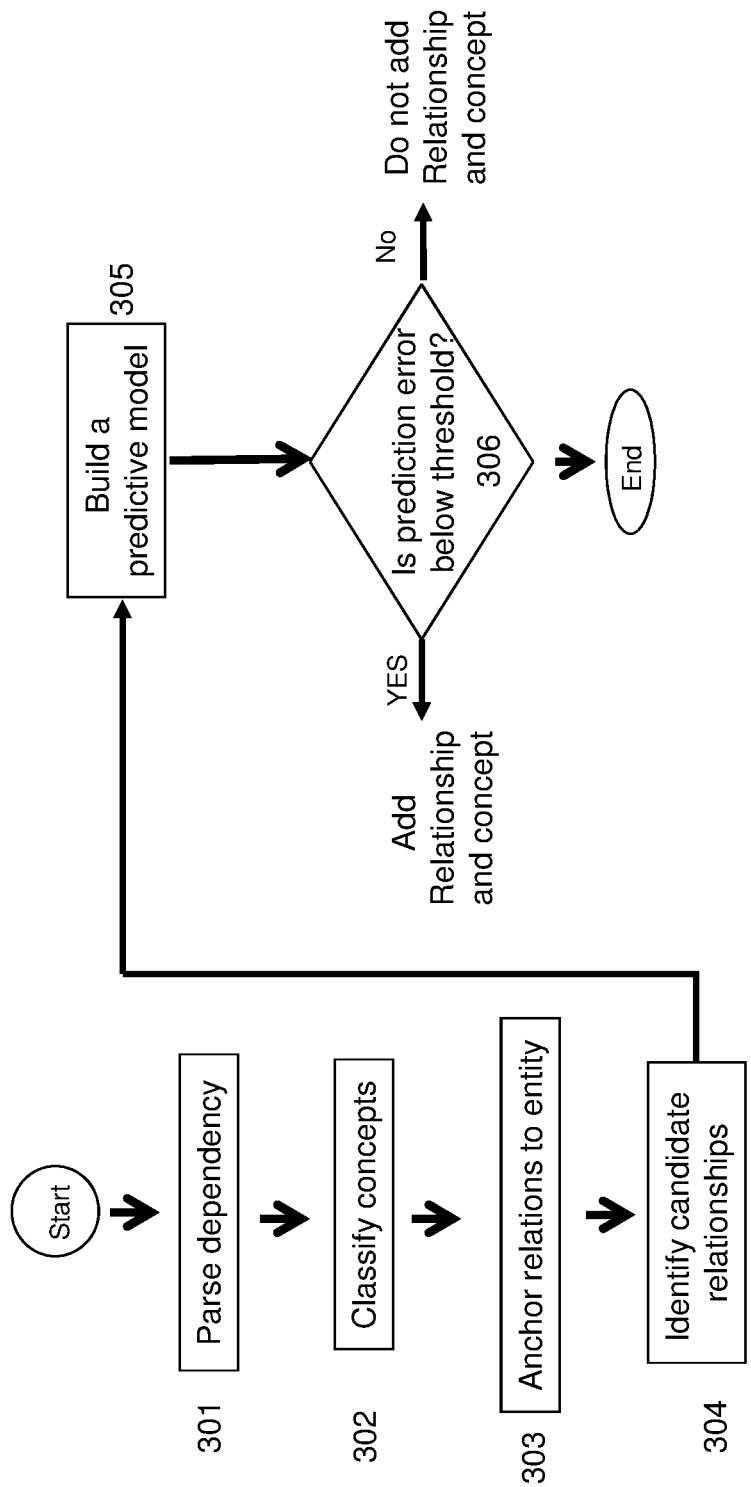
FIG. 3 illustrates a method 300 (e.g., computer-implemented method) of analyzing text documents according to another exemplary aspect of the present invention.

FIG. 3 illustrates a method 300 of analyzing text documents according to another exemplary aspect of the present invention. As illustrated, the method 300 includes step 301, in which a sentence is parsed (e.g., [[A [house]] [adjacent] [to [a [playground]]]]), and step 302, in which entities are classified as types (e.g., [house], [playground] and relation extraction [adjacent to]). Note that play space, jungle gym etc. may also be classified as "playground".

In step 303, relations are anchored to an entity (e.g., (adjacent-to, house-1, playground)). First, entities must be identified. This can be done, for example, by co-reference within the document or by implicit reference (for example, [a house] might be an implicit reference to a particular house in this document, house-51). Next relations would need to be anchored to an entity. This can be done by navigating the dependencies (based on prepositional phrase attachments, for example). In step 304, candidate generalizations of the entity types (e.g., playground is a "recreational Facility") are identified by traversing both DAGs:
  a: compute support for each triple (# of examples where adjacent-to recreationalFacility)
  b: compute conciseness (# of types of objects that can be adjacent-to)

In step 305, a predictive model is built from each of the candidate relationships that meet a threshold of support and conciseness. In step 306, it is determined whether the prediction error is below a threshold and if so, then the relationship and concept are added to a database, and if not, then the relationship and concept are not added to a database. After deciding whether to add the relationship and concept, all concept types may be combined into a disjunct (e.g., near X where X is recreationalFacility OR educationalFacility).

Figure 4:
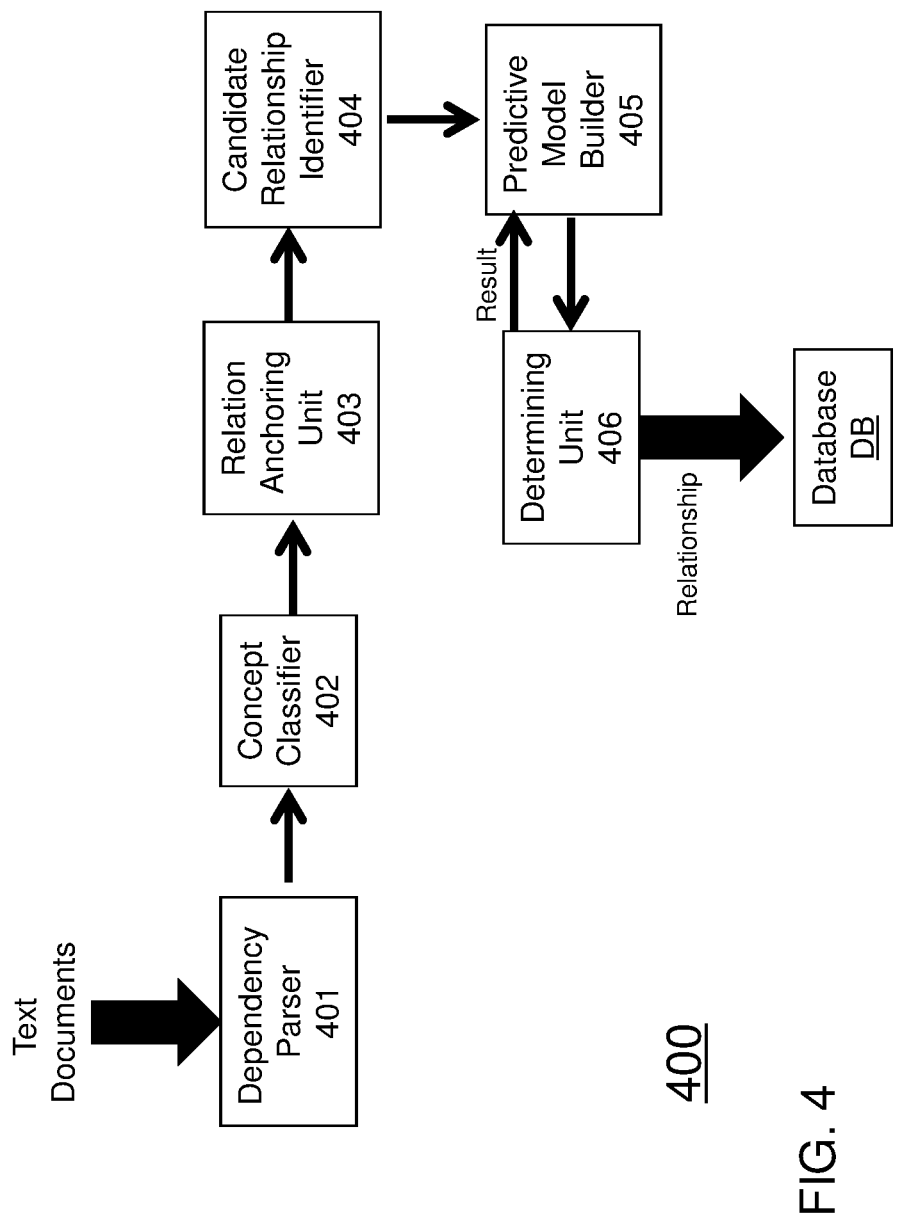
FIG. 4 illustrates a system 400 for analyzing text documents according to another exemplary aspect of the present invention.

FIG. 4 illustrates a system 400 for analyzing text documents according to another exemplary aspect of the present invention. As illustrated, the system 400 includes a dependency parser 401 which parses a dependency, a concept classifier 402 which classifies concepts, a relation anchoring unit 403 which anchors relations to an entity (e.g., by co-reference or by implicit reference), a candidate relationship identifier 404 which identifies candidate relationships, a predictive model builder 405 which builds a predictive model from each of the candidate relationships that meet a threshold of support and conciseness, and a determining unit 406 which determines whether the prediction error is below a threshold. If so, then the determining unit 406 includes the relationship and concept in the database DB, and if not, then the determining unit 406 does not include the relationship and concept in the database DB.

As further illustrated in FIG. 4, the determining unit 406 may also feedback a result of its determination to the predictive model builder 405. The predictive model builder 405 may then update its model building methodology based on the result in order to improve the accuracy of the system 400.

Figure 5:
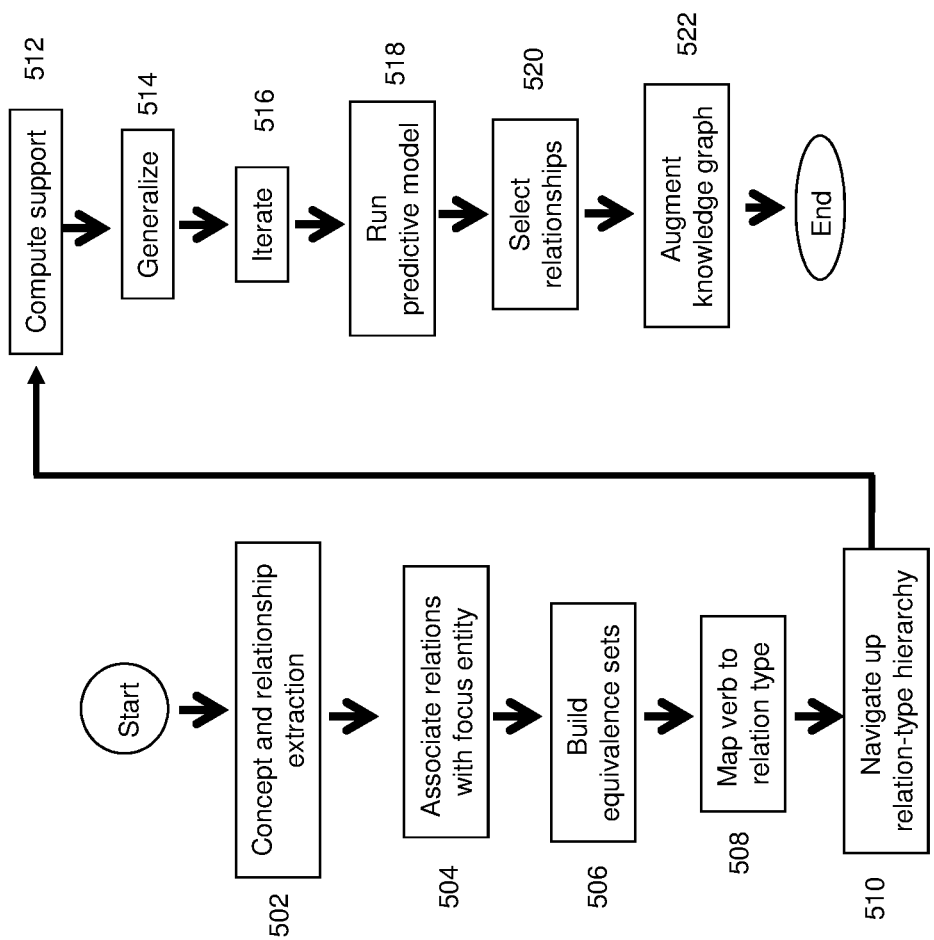
FIG. 5 illustrates a method 500 (e.g., computer-implemented method) of analyzing text documents, according to another exemplary aspect of the present invention.

FIG. 5 illustrates a method 500 of analyzing text documents, according to another exemplary aspect of the present invention.

By way of preview and without limitation, systems should select an appropriate level of generality for the knowledge representation so that knowledge graphs can be automatically tuned for particular domains. An exemplary aspect of the present invention (e.g., method 500) may find that level by extracting patterns of concepts and relationships from text documents and finding those with enough support in terms of examples, enough generalization in terms of common patterns (description length), and enough predictive power (by generating features from the concepts and relationships and measuring the prediction error).

Some aspects of the present invention (e.g., method 500) take into account conciseness of knowledge and its effect on predictive power to build knowledge graphs that can assist with effective decision making. Some aspects of the present invention (e.g., method 500) may thus extract a base level of relationships (triples) from text, map to concept types and relation types in an ontology, find patterns to generate high-level relationships, compute properties of the combination of high-level relationships, and connect the maximal set of relationships into a domain knowledge graph.

Some aspect of the present invention (e.g., method 500) may use three measures to determine whether to add a relationship to a database (e.g., whether to augment a knowledge graph): 1) prediction error, 2) conciseness, and 3)

support. For the prediction error, the text may be associated with a focus object (e.g., a house) in a database. The focus object may then have an outcome variable (e.g., price) and a set of features (e.g., hasRoom living room, hasRoom kitchen, etc.). If, for example, the hasRoom feature is predictive of the house price, then the prediction error property is low.

Once a domain knowledge graph has been constructed, it can be curated and used for a variety of applications.

Referring now to FIG. 5, the method 500 includes:

In step 502: Perform concept and relationship extraction on the textual descriptions associated with entities (e.g., houses). This can be performed with techniques such as maximum entropy sequential classification. Thus, the input to the system (e.g., system 200, system 400) may include semi-structured data (e.g., text associated with a database entry and outcome variables associated with the entities, such as selling price, 5-year projected value, and so on).

In step 504: Associate relations (e.g., and attributes) with the focus entity using co-reference (e.g., "this house") or implicit reference (e.g., "three bedroom in the Lower Hudson Valley with great views"). In this way, the method 500 may be able to collect the triples <house-1, near, river> etc.

In step 506: Build equivalence sets of concept-relationship-concept triples (could be generalized to n-ary relations) according to given verbs or verb+prepositions (e.g., "attach-to"). For example, the equivalence sets may include <"mother-in-law apartment", "attach", "house">, <"garage", "attach", "house">.

In step 508: Map the verbs/verb+prepositions to relation types in the ontology. There are many methods of doing this, including matching context words, using term frequency, classifiers, etc.

In step 510: Navigate up the relation-type hierarchy by collecting sets of concepts. For example, the method 500 may determine what things could be attached (e.g., apartment, garage, sunroom, etc.), and then collect up the sets of what is near what else (e.g., the apartment is attached, so it is near; the sewer is near, etc.). These are put into sets. The set of the N concepts, the relation, and the set of M concepts generate N&M relationships (triples).

In step 512: Compute support (# of examples matching the triple). The method 500 may filter by level of support at this point.

In step 514: Generalize:
a. If two concepts are found in a triple, search the concept type hierarchy for a subsuming concept. Subsumption is a well-known technique. For example, the method 500 may find "sewer" and "garage" are "municipal object".
b. If there is a more general relation (or multiple), combine all of the triples from the subsumed relations. For example, find "attach" and "atRegion" are both "near", for example. Again, this may result in some loss of predictive power.
c. Compute conciseness (the number of triples associated with the current relation-type).
d. Filter the triples using a combination of conciseness and support. High conciseness and high support triples are maintained.

Support may be low if there are too few examples of the high-level relationships. Standard deviation can be used to trim the examples.

Conciseness may be low if there is a high branching factor e.g. various types of object are "near", and no way to generalize them using the ontology.

In step 516: Iterate over triples and build features (<house, near, [sewer, garage]). This might result in, for example:
entity-1
near-sewer 1.0
near-garage 0.0
entity-2
near-sewer 0.0
near-garage 1.0

In step 518: Run the predictive model with the features and compute prediction error (prediction error).

In step 520: Select relationships to include in the knowledge graph by minimizing prediction error. Prediction error may be low if the relationship is too high-level (e.g., "near" doesn't matter as much as "attach").

In step 522: Augment the knowledge graph (e.g., <house, near, sewer>, <house, near, garage>) with the selected relationships. If the number of relationships reaches a maximum or the predictive model score (F1 or precision/recall) reaches a maximum (or surpasses a given threshold, to avoid overfitting) then the method 500 may stop.

For example, assume that a sample input to the method 500 is in the form of natural language text with associated outcomes (prices). The method 500 may perform natural language processing of the sample input as follows:
house-1: 3 bdr 2.5 bath brick colonial with attached garage near the water.

Given this description, the method 500 may be able to use relation extraction algorithms to extract:
a) entity 1: "house-1" relation1: "attached" entity2: "garage"
b) entity 1: "house-1" relation1: "near" entity2: "water-1"
house-2: Move-in ready 3 bedroom house on corner lot with rare 2-car detached garage closeby to the water.

Given this description, the method 500 may be able to use relation extraction algorithms to extract:
a) entity 1: "house-2" relation1: "detached" entity2: "garage"
b) entity 1: "house-2" relation1: "near" entity2: "water-1"

For the ontology, the method 500 may use, for example, a lexical database (e.g., WordNet) which may include troponyms (is-a relationships between verbs).

Figure 6:
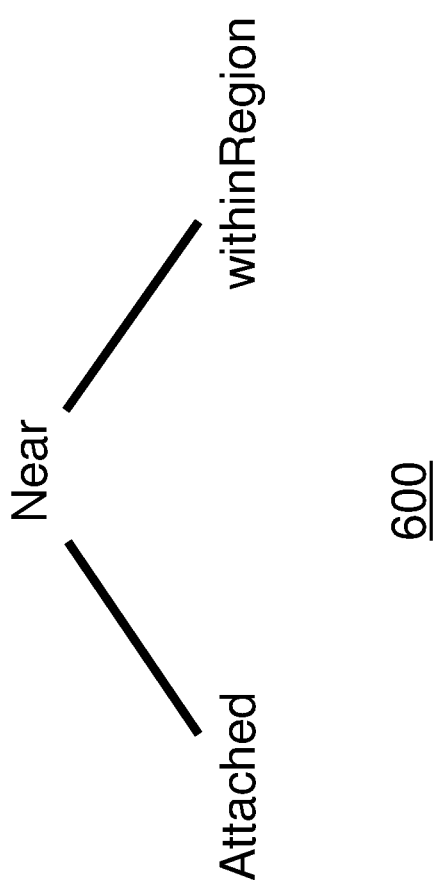
FIG. 6 illustrates a complex relation type 600, according to an exemplary aspect of the present invention.

Some embodiments of method 500 use more complex relation types. FIG. 6 illustrates a complex relation type 600, according to an exemplary aspect of the present invention. The complex relation type 600 includes "attached; near; withRegion" and may be used for the ontology example, in the method 500.

Relationships (e.g., triples) may provide constraints on which types of relations, at various levels of abstraction, can connect which types of concepts, at various levels of abstraction, thus reducing the complexity of the feature selection problem. The method 500 may maintain sets of concepts for each part of a triple (set1, relation1, set2).

The exemplary aspects of the present invention may provide several advantages. In particular, a domain may have multiple prediction problems utilizing the same basic knowledge representation. For example, predicting house prices and predicting ability to rent rooms as a temporary bed and breakfast are similar but not identical.

The exemplary aspects of the present invention may provide a concise high-level set of relationships that can be useful across multiple prediction problems. A concise graph of higher-level relationships may also be useful for natural language understanding (e.g., disambiguation), natural language generation, discourse, discovery, and other situations.

Having relationship triples (e.g., concept1, relations, concept2) at an appropriate level of abstraction is useful for a variety of applications. For example, when performing semantic graph projection for decision-making and other tasks (search, navigation, discovery), it is important to select concepts and relations from the semantic graph at appropriate levels of abstraction.

For example, when buying a house it may be useful to understand the dynamics of schools before tackling day schools vs. elementary schools, and the dynamic between houses, schools, prisons, and so on before tackling the nuances of the relationships between elementary schools and prisons.

Furthermore, having an appropriate level of abstraction can allow for summaries, Q&A, dialogue, and other applications at a higher level of discourse. Having a semantic graph at the appropriate level of abstraction can also be a starting point for finding specific relationships in a data set with similar types of relations but with a different vocabulary.

A system using a knowledge graph may want to augment a graph with higher-level relationships. First, natural language queries may more easily map to higher level relationships. For example, a user might ask if the walkway is connected to the house. The system can then traverse the graph to explore the possible ways in which such objects could be connected. Second, the system may require a more compact representation e.g. for a summary. Third, the higher-level knowledge representation may be useful for porting across domains. When starting on horticulture or architecture, for example, the relationship "connected' could be useful and could be specialized for the new domain into lower-level relationships.

In general, with the right set of abstraction (i.e., augmenting the knowledge graph with a selected set of higher-level relations), exemplary aspects of the present invention can provide analytical exploration/navigation such as drill down and roll up operations (key components of traditional analytics platforms based on relational data warehouses) over the knowledge graph.

Therefore, exemplary aspects of the present invention may bring such capability to knowledge graphs (e.g., building knowledge cubes).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
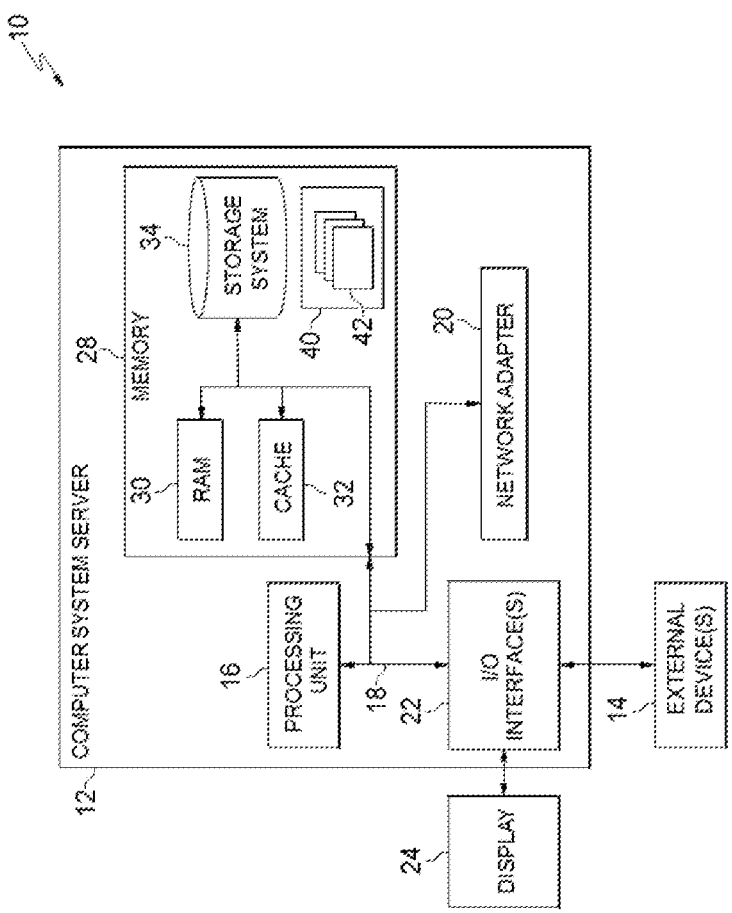
FIG. 7 depicts a computing node according to an exemplary aspect of the present invention.
Figure 8:
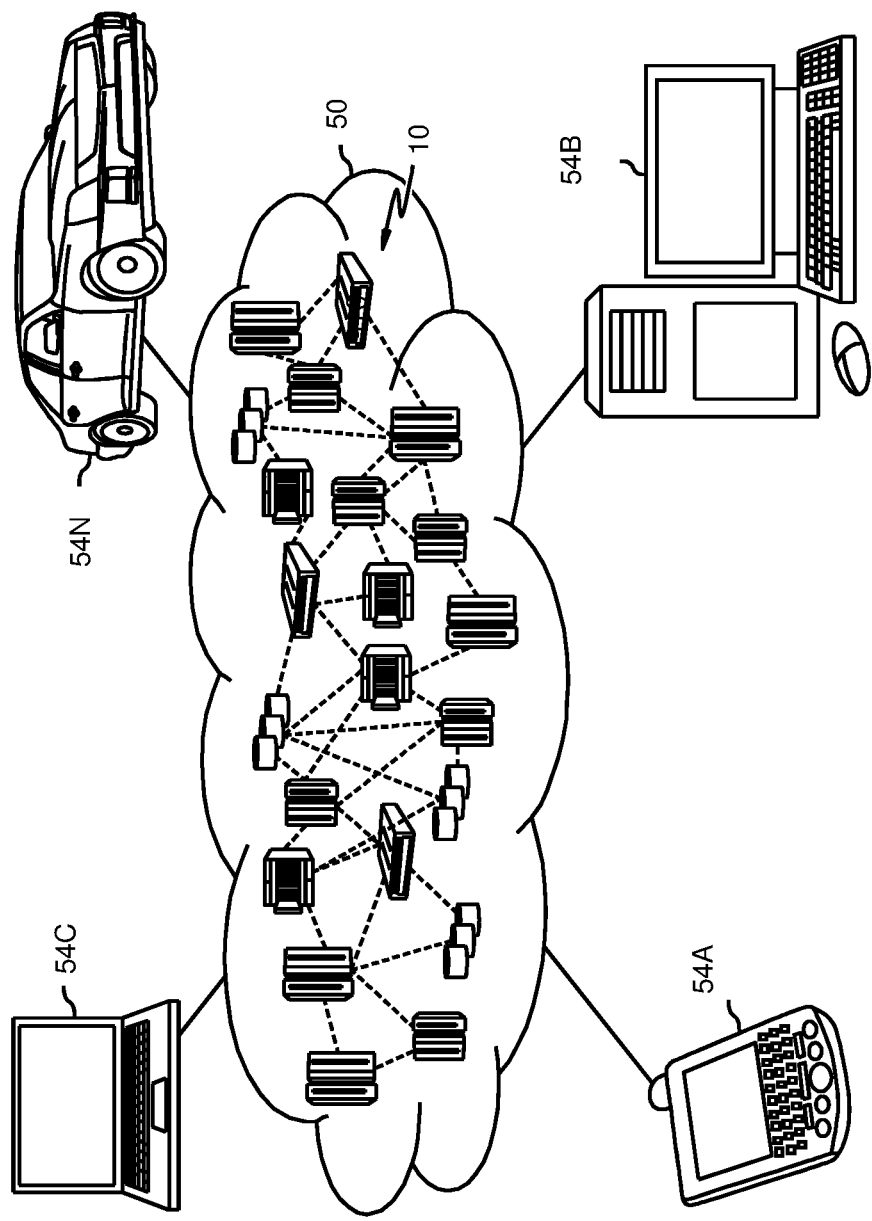
FIG. 8 depicts a cloud computing environment according to an exemplary aspect of the present invention.
Figure 9:
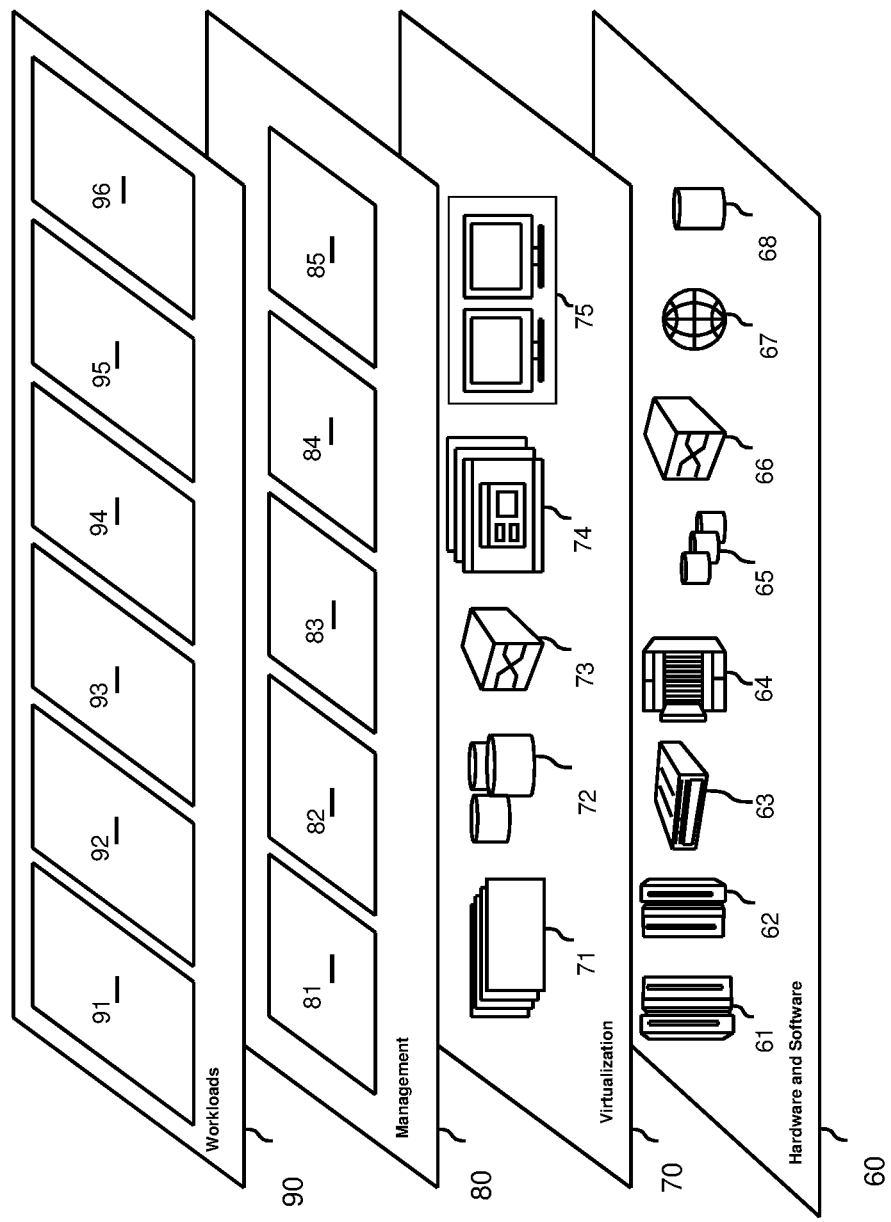
FIG. 9 depicts abstraction model layers according to an exemplary aspect of the present invention.

FIGS. 7-9 illustrate other exemplary aspects of the present invention. It is to be understood that although this disclosure includes a detailed description on cloud computing, implementation of the teachings recited herein are not limited to a cloud computing environment. Instead, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, a schematic example of a cloud computing node 10 is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring more specifically now to FIG. 7, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 (along with program data or some combination thereof) can carry out various functions and/or methodologies of the present invention.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 8, an exemplary cloud computing environment 50 in accordance with the present invention is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof.

This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 9, an exemplary set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analyzing text documents 96 in accordance with aspects of the present invention.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive method and system is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A computer-implemented method of analyzing text documents, comprising:
   identifying a relationship in a text document associated with an entity;
   resolving the relationship to an ontology with relation types at varying levels of abstraction;
   building a predictive model from training data based on the relation types at the varying levels of abstraction, in response to said identifying the relationship, wherein the predictive model includes a prediction error;
   computing a conciseness of the identified relationship, the conciseness of the identified relationship comprising a multiplicative inverse of a description length of the identified relationship; and
   determining whether to store the identified relationship in memory, based on:
      the computed conciseness of the identified relationship;
      whether the prediction error is reduced when a feature incorporating the identified relationship is used in the predictive model; and
      whether there is sufficient support of the identified relationship in terms of matching examples in the text document.

2. The method of claim 1, wherein the determining of whether to store the identified relationship comprises augmenting a knowledge graph with the identified relationship if the prediction error was reduced when a feature incorporating the relationship was used in the predictive model.

3. The method of claim 1, wherein the identified relationship comprises a triple which includes a set of concepts related to a second set of concepts, and the determining of whether to store the identified relationship is based on a conciseness of the triple.

4. The method of claim 1, wherein the identified relationship comprises a triple which includes a set of concepts related to a second set of concepts, and the determining of whether to store the identified relationship is based on a support for the triple in the text document.

5. The method of claim 1, wherein the determining of whether to store the identified relationship comprises determining to store the identified relationship if a value of the prediction error is below a threshold value.

6. The method of claim 1, wherein the identified relationship comprises a triple which relates a generalization of a target entity through a relationship type.

7. The method of claim 1, wherein the identified relationship comprises a plurality of relationships that comprise taxonomies of concept and relation types.

8. The method of claim 7, further comprising:
   generating a plurality of features for the entity from the plurality of relationships.

9. The method of claim 8, further comprising:
   selecting a level of abstraction of the plurality of relationships from the varying levels of abstraction.

10. The method of claim 1, wherein at least one of the identifying of the relationship, the building of the predictive model, and the storing of the identified relationship are performed in a cloud-computing environment.

11. A system for analyzing text documents, comprising:
    a processor; and
    a memory, the memory operably coupled to the processor and storing instructions to cause the processor to:
       identify a relationship in a text document associated with an entity;
       resolve the relationship to an ontology with relation types at varying levels of abstraction;
       build a predictive model from training data based on the relation types at the varying levels of abstraction, in response to said identifying the relationship, wherein the predictive model includes a prediction error;

compute a conciseness of the identified relationship, the conciseness of the identified relationship comprising a multiplicative inverse of a description length of the identified relationship; and determine whether to store the identified relationship in memory, based on:

the computed conciseness of the identified relationship;

whether the prediction error is reduced when a feature incorporating the identified relationship is used in the predictive model; and whether there is sufficient support of the identified relationship in terms of matching examples in the text document.

12. The system of claim 11, wherein the processor adds the identified relationship to the database by augmenting a knowledge graph with the identified relationship if the prediction error over the training data was reduced when the feature was used in the predictive model.

13. The system of claim 11, wherein the processor decides whether to add the identified relationship to the database based on a conciseness of a triple which includes a set of concepts related to a second set of concepts.

14. The system of claim 11, wherein the processor decides whether to add the identified relationship to the database based on a support for a triple which includes the number of occurrences of the triple in the extracted concepts and relationships from the text documents.

15. The system of claim 11, wherein the processor adds the identified relationship to the database if a value of the prediction error using the feature is below a threshold value.

16. The system of claim 11, wherein the identified relationship comprises a triple which relates a generalization of a target entity through a relationship type.

17. The system of claim 11, wherein the identified relationship comprises a plurality of relationships that comprise taxonomies of concept and relationship types.

18. The system of claim 17, wherein the processor generates a plurality of features for the entity from the plurality of relationships, and wherein the processor selects a level of abstraction of the relationships from the varying levels of abstraction.

19. The system of claim 11, wherein the processor performs at least one of the identifying of the relationship, the building of the predictive model, and the storing of the identified relationship in a cloud-computing environment.

20. A computer program product for analyzing text documents, the computer program product comprising a computer readable storage medium having program instructions embodied therewith, the program instructions executable by a computer to cause the computer to:

identify a relationship in a text document associated with an entity;

resolve the relationship to an ontology with relation types at varying levels of abstraction;

build a predictive model from training data based on the relation types at the varying levels of abstraction, in response to said identifying the relationship, wherein the predictive model includes a prediction error;

compute a conciseness of the identified relationship, the conciseness of the identified relationship comprising a multiplicative inverse of a description length of the identified relationship; and determine whether to store the identified relationship in memory, based on:

the computed conciseness of the identified relationship;

whether the prediction error is reduced when a feature incorporating the identified relationship is used in the predictive model; and whether there is sufficient support of the identified relationship in terms of matching examples in the text document.

* * * * *